G. V. HARRIMAN.
SYRINGE.
APPLICATION FILED APR. 3, 1919.
1,348,412.
Patented Aug. 3, 1920.
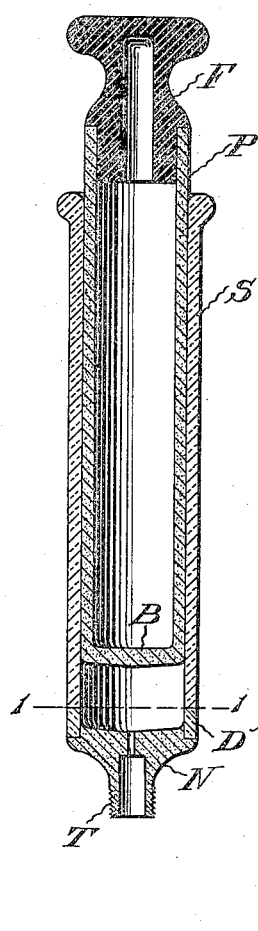
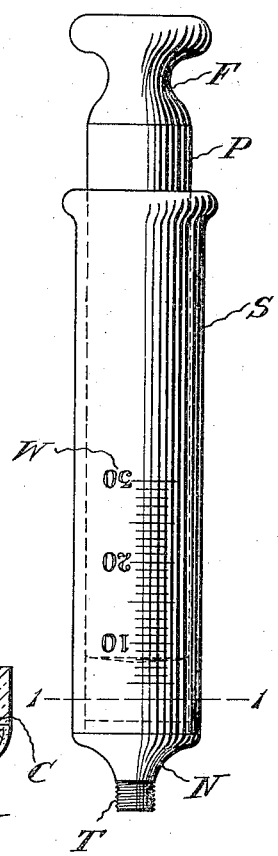
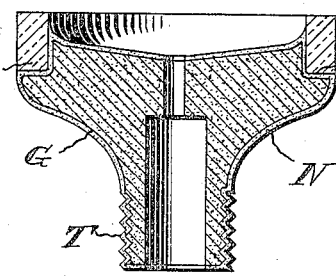
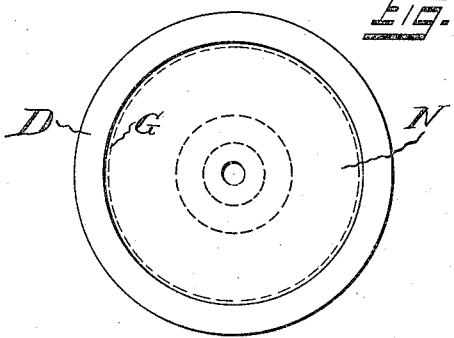
WITNESS:
Louis C. Badeau
H. D. Penney
INVENTOR.
George V. Harriman,
BY
F. W. Richard,
ATTORNEY.

UNITED STATES PATENT OFFICE.

GEORGE V. HARRIMAN, OF NEW YORK, N. Y.

SYRINGE.

1,348,412.

Specification of Letters Patent.

Patented Aug. 3, 1920.

Application filed April 3, 1919. Serial No. 287,152.

*To all whom it may concern:*

Be it known that I, GEORGE V. HARRIMAN, a citizen of the United States, residing in New York city, in the county of New York and State of New York, have invented certain new and useful Improvements in Syringes, of which the following is a specification.

My present invention relates to an improvement in syringes and more especially relates to the body thereof, and contemplates a new means and structure for making the syringe out of two unlike materials fused together in such a manner as to form a satisfactory article.

The important feature in my device is in the method whereby glass may be satisfactorily joined or fused to any other vitreous material such as lava, porcelain or the like.

In the drawings accompanying,—

Figure 1 is a side elevation of my device;

Fig. 2 is a sectional view thereof;

Fig. 3 is an enlarged sectional view of the tip in an early stage of manufacture of the syringe; and Fig. 4 is a plan view of the syringe tip.

In Fig. 1, my device is shown as being of two component members, namely, the plunger P and the outer syringe body S, and as shown in Fig. 2, the plunger P being constructed, preferably, as a single member, the bottom of which is closed as at B, and being made entirely of glass.

At the upper end thereof there is located an operating handle or finger-knob F, which may be of any suitable material such as hard rubber or the like and snugly fitted in the upper end of the plunger P.

Fig. 2 shows the outer syringe body S as being made preferably of glass, the lower end thereof being joined to a special form of tip or nozzle N. In the present instance, I prefer lava rather than any other type of vitreous material for the reason that in having the tip so made I am enabled to have a much better and stronger thread T cut thereon than is possible with either glass, porcelain, or any other well-known vitreous materials of like nature.

The threaded portion T is utilized to maintain, in proper operative connection and alinement, various types of needles or nozzles as is desirable and customary to use, and it is usually necessary, in view of the fact that such needles and nozzles are usually made of metal, that the connecting threads therefor, on the syringe, be cut with the same precision as the threads in the metal connecting members so that they may be joined together properly when so desired. It is practically and commercially impossible to provide screw threads of proper mechanical precision on glass or porcelain, as I have found in practice, but I also have discovered that lava lends itself very readily to the same treatment as metal in machining, and that threads may be cut thereon with great facility after which the lava may be treated by firing and glazing substantially the same as other vitreous materials.

In the method by which glass syringes are usually made, it is almost impossible to obtain a suitable thread thereon and a much better thread may be made of a porcelain piece, but the best thread, as I have found in practice, is possible with the use of lava.

It is somewhat objectionable to make the entire syringe of lava, and inasmuch as I desire to have the body of the syringe and its plunger transparent, so that the quantity within the syringe may be noted, I have therefore decided to utilize glass for its well-known sanitary qualities and transparency and to combine therewith at the nozzle portion thereof the lava end or tip with the suitable threads cut thereon.

As a means for permitting the proper joining of the lava tip to the glass syringe body S, I have found that after the lava tip has been made up, if it be glazed in the usual manner, that I can weld or fuse a piece of glass thereto, the adhesion between the two being formed by the coating of glazing finish on the lava.

Therefore it will be ascertained by referring to Fig. 3 which is an enlarged sectional view of the lava tip member N, in its unitary form, ready to be attached to a cylindrical syringe body S, that the same is coated with a predetermined thickness of glazing, generally denoted by G.

It will also be noted that the tip member N is provided with an annular seat C. Into this seat C, I introduce at the proper time, a small circular ring of glass D which is fused to the glazed finish on the lava tip at the proper heat temperature. The lava tip in its present form is now in condition for attaching to the syringe body, and this next operation consists in the welding thereto of a cylindrical glass syringe body shell S to the glass fusing-connection D by the usual methods.

The jointure of the two members D and S, is indicated in the various figures by the line 1—1.

It will be observed that the syringe tip as shown in Fig. 3 is a separate article and may be made in large quantities, being extremely cheap as well as being much stronger than glass, and at the same time providing, as aforementioned, for a well cut precision thread for the reception of the various nozzle connections that are used from time to time therewith, thereby making a fluid tight joint and preventing the loss of the contents of the syringe by leaking during use.

As indicated in Fig. 1, the outer syringe body member S may be provided with a suitable index or scale W so that the amount of fluid content therein may be measured by observation.

Having thus described my invention it should be understood that there may be modifications thereof and variations therein without departing from the spirit of my invention or exceeding the scope of the appended claims.

Having thus described my invention, what I claim is—

1. A syringe comprising a body portion of vitreous material, and a glazed nozzle for the body portion of vitreous material different in kind from the vitreous material of the body portion and fused to the body portion.

2. As an article of manufacture, a vitreous nozzle tip for syringes having a glass fusing piece fused thereto.

3. As an article of manufacture, a lava nozzle tip having threads cut thereon, and having a glass fusing piece fused thereto.

4. The method of making a syringe body of glass having a nozzle of another vitreous material attached thereto, consisting in shaping the vitreous member to the desired shape, baking the same, then glazing the same, and then fusing the glass jointure member to the said vitreous member, and then fusing the glass syringe body thereto.

5. As an article of manufacture, a threaded tip member of lava for a syringe body of vitreous material, said tip member being glazed for fusing to said body and being of lava adapted for cutting a thread thereon.

6. As an article of manufacture, a threaded tip member of lava for a syringe body of glass, said tip member being of lava adapted for cutting a thread thereon and being glazed, and having fused thereto a glass connection for fusing said connection to the glass body.

GEORGE V. HARRIMAN.

Witnesses:
MARTHA VOLZ,
FRANK VOLZ.